(12) United States Patent
Xu et al.

(10) Patent No.: US 11,203,229 B2
(45) Date of Patent: Dec. 21, 2021

(54) ASSEMBLED WHEEL

(71) Applicant: CITIC Dicastal CO., LTD., Hebei (CN)

(72) Inventors: Zuo Xu, Qinhuangdao (CN); Bowen Xue, Qinhuangdao (CN); Chuanqun Li, Qinhuangdao (CN); Weidong Liu, Qinhuangdao (CN); Jiandong Guo, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 265 days.

(21) Appl. No.: 16/257,250

(22) Filed: Jan. 25, 2019

(65) Prior Publication Data

US 2019/0351703 A1 Nov. 21, 2019

(30) Foreign Application Priority Data

May 21, 2018 (CN) .......................... 201810487794.7

(51) Int. Cl.
*B60B 23/06* (2006.01)
*B60B 3/04* (2006.01)
*B60B 25/20* (2006.01)

(52) U.S. Cl.
CPC .............. *B60B 23/06* (2013.01); *B60B 3/041* (2013.01); *B60B 3/044* (2013.01); *B60B 25/20* (2013.01); *B60B 2900/111* (2013.01)

(58) Field of Classification Search
CPC ......... B60B 3/0005; B60B 3/04; B60B 3/041; B60B 3/042; B60B 3/044; B60B 3/045; B60B 23/00; B60B 23/06; B60B 23/10; F16D 65/12; F16D 2063/138; B60T 1/065

See application file for complete search history.

(56) References Cited

U.S. PATENT DOCUMENTS

| | | | | |
|---|---|---|---|---|
| 1,378,300 A | * | 5/1921 | Williams | .................. B60B 3/04 301/6.1 |
| 1,398,739 A | * | 11/1921 | Putnam | ..................... B60B 3/04 301/6.7 |
| 1,406,759 A | * | 2/1922 | Putnam | ..................... B60B 3/04 301/6.7 |
| 1,761,928 A | * | 6/1930 | Main | ....................... B60B 11/06 301/6.6 |
| 1,840,824 A | * | 1/1932 | Sinclair | ................... B60B 23/10 301/6.1 |
| 1,916,747 A | * | 7/1933 | Wagenhorst | ............ B60B 25/20 301/6.6 |
| 1,924,970 A | * | 8/1933 | Ash | ........................... B60B 3/16 301/11.1 |
| 2,019,145 A | * | 10/1935 | Le Jeune | .................. B60B 7/04 301/6.3 |

(Continued)

*Primary Examiner* — Jason R Bellinger
(74) *Attorney, Agent, or Firm* — Cooper Legal Group, LLC

(57) ABSTRACT

An assembled wheel includes a spoke, a T nut, a screw, a fixing ring, a rim, a brake drum. In use, the T nut is installed in the outermost T groove of the spoke; a second boss on a connecting ring fits with the groove on the back of the spoke; the spoke, the connecting ring and the fixing ring are connected together by the first screw; grooves on the outer side of the brake drum fit with a first boss in the right circumferential direction of the fixing ring; and the second screw axially fixes the brake drum in the fixing ring through a spacer.

1 Claim, 4 Drawing Sheets

(56) References Cited

U.S. PATENT DOCUMENTS

| | | | | | |
|---|---|---|---|---|---|
| 2,041,326 | A | * | 5/1936 | Eksergian | B60B 1/14 |
| | | | | | 301/64.101 |
| 2,098,851 | A | * | 11/1937 | Ash | B60B 23/10 |
| | | | | | 301/64.101 |
| 4,282,952 | A | * | 8/1981 | Bartley | B60B 23/10 |
| | | | | | 180/10 |
| 5,096,264 | A | * | 3/1992 | Hayashi | B60B 3/06 |
| | | | | | 301/64.202 |
| 8,840,193 | B2 | * | 9/2014 | Schmidt | B60B 27/0031 |
| | | | | | 301/6.8 |
| 10,828,933 | B2 | * | 11/2020 | Liu | B60B 3/044 |
| 2010/0176651 | A1 | * | 7/2010 | Thomas | F16D 55/22 |
| | | | | | 301/6.8 |
| 2013/0169024 | A1 | * | 7/2013 | Schmidt | B60B 3/14 |
| | | | | | 301/6.8 |
| 2015/0273934 | A1 | * | 10/2015 | Huidekoper | B60B 23/10 |
| | | | | | 301/11.1 |
| 2018/0037056 | A1 | * | 2/2018 | Jungbecker | B60B 3/04 |
| 2019/0193461 | A1 | * | 6/2019 | Xue | F16D 65/12 |

* cited by examiner

ASSEMBLED WHEEL

CROSS-REFERENCE TO RELATED APPLICATIONS

The present application claims benefit of Chinese Patent Application No. 201810487794.7, filed on May 21, 2018, the contents of which are hereby incorporated by reference in its entirety.

BACKGROUND

At present, the automotive industry is moving in the direction of green development, and it also puts forward a higher requirement for wheels as important moving parts. In order to achieve the purpose of weight reduction, rims and spoke disks need to be made of different materials. The different materials are often connected by bolting. Bolts bear very large shear force when the wheels run, so many screws fastening are needed to meet the requirement for structural strength. Therefore, the quantity of screws used can be effectively reduced by designing ingenious connecting structures.

SUMMARY

The present disclosure relates to a wheel, specifically to an assembled wheel.

The objective of the present disclosure is to provide an assembled wheel, which can avoid the transmission of shear force generated during driving to screws in use and achieve the purpose of weight reduction by reducing the number of screws. In addition, an annular brake drum is installed in a fixing ring, which not only effectively increases the braking radius and reduces the clamping force required for braking, but also effectively releases the wheel back cavity space.

In order to achieve the above objective, the technical solution of the present disclosure is: an assembled wheel includes a spoke disk, a T nut, a connecting ring, a first screw, a fixing ring, a rim, a brake drum, a spacer, a second screw, the T nut is installed in the outermost T groove of the spoke disk; the spoke disk is in contact with the left side of the connecting ring, and the left side of the fixing ring is in contact with the right side of the connecting ring; the first screw is matched with the T nut to connect the spoke disk, the connecting ring and the fixing ring together; the outer side of the connecting ring is integrated with the rim; a second boss is arranged above the connecting ring to fit with the groove of the spoke disk; a first boss is arranged in the right circumferential direction of the fixing ring; grooves are formed on the outer side of the annular brake drum to fit with the first boss such that the brake drum is circumferentially fixed in the fixing ring; and the second screw axially fixes the brake drum in the fixing ring through the spacer.

In the working process, the T nut is installed in the outermost T groove of the spoke disk; the second boss on the connecting ring fits with the groove on the back of the spoke disk; the spoke disk, the connecting ring and the fixing ring are connected together by the first screw; a plurality of grooves on the outer side of the brake drum fit with the first boss in the right circumferential direction of the fixing ring such that the brake drum is circumferentially fixed in the fixing ring; and the second screw axially fixes the brake drum in the fixing ring through the spacer.

The assembled wheel can avoid the transmission of shear force generated during driving to the screws in use and achieve the purpose of weight reduction by reducing the number of screws. In addition, the annular brake drum is installed in the fixing ring, which not only effectively increases the braking radius and reduces the clamping force required for braking, but also effectively releases the wheel back cavity space. At the same time, the assembled wheel has the characteristics of high structural strength, light weight, convenient installation and the like.

LIST OF REFERENCE SYMBOLS

Figure 1:
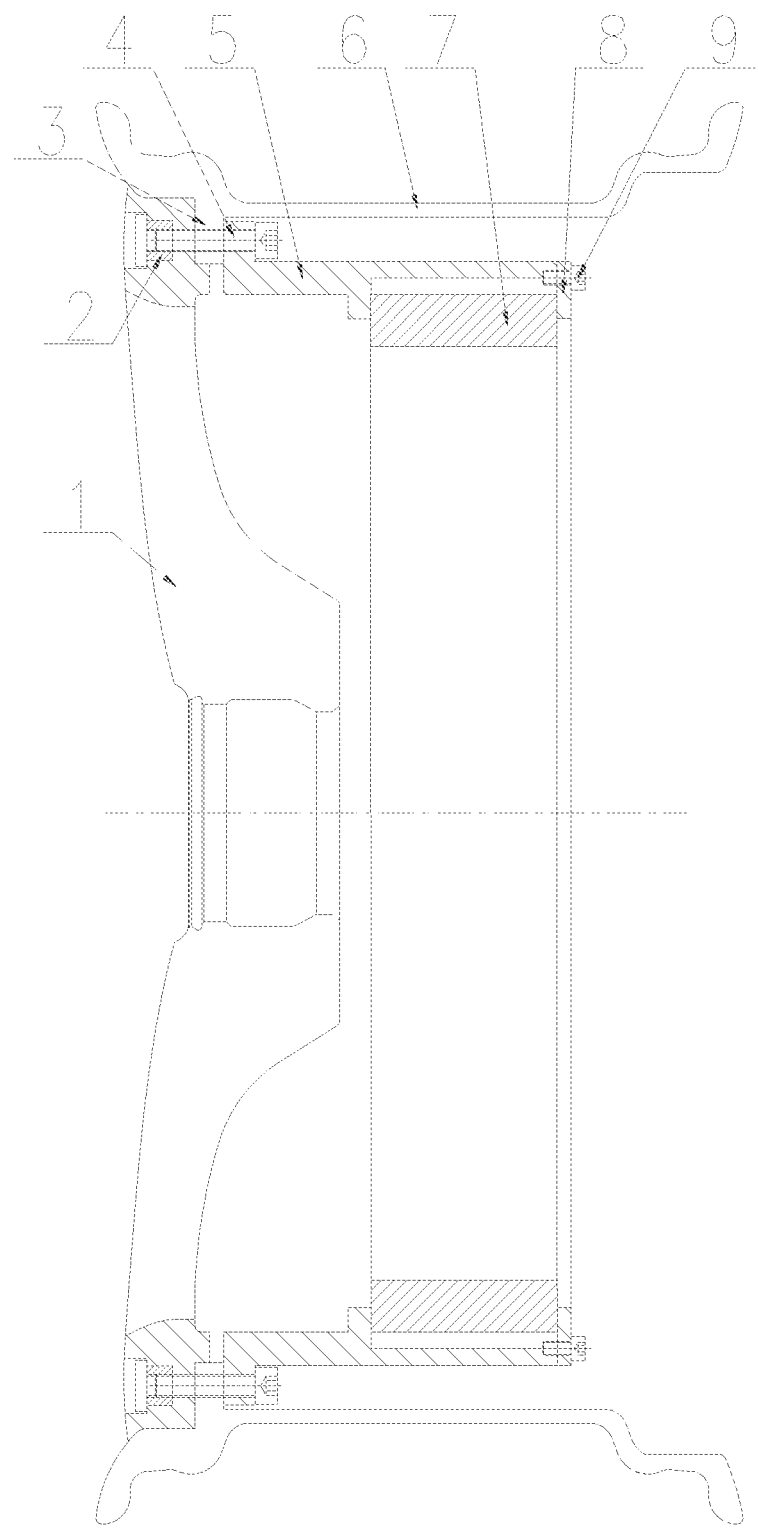
FIG. 1 is a front view of an assembled wheel according to the present disclosure.
Figure 2:
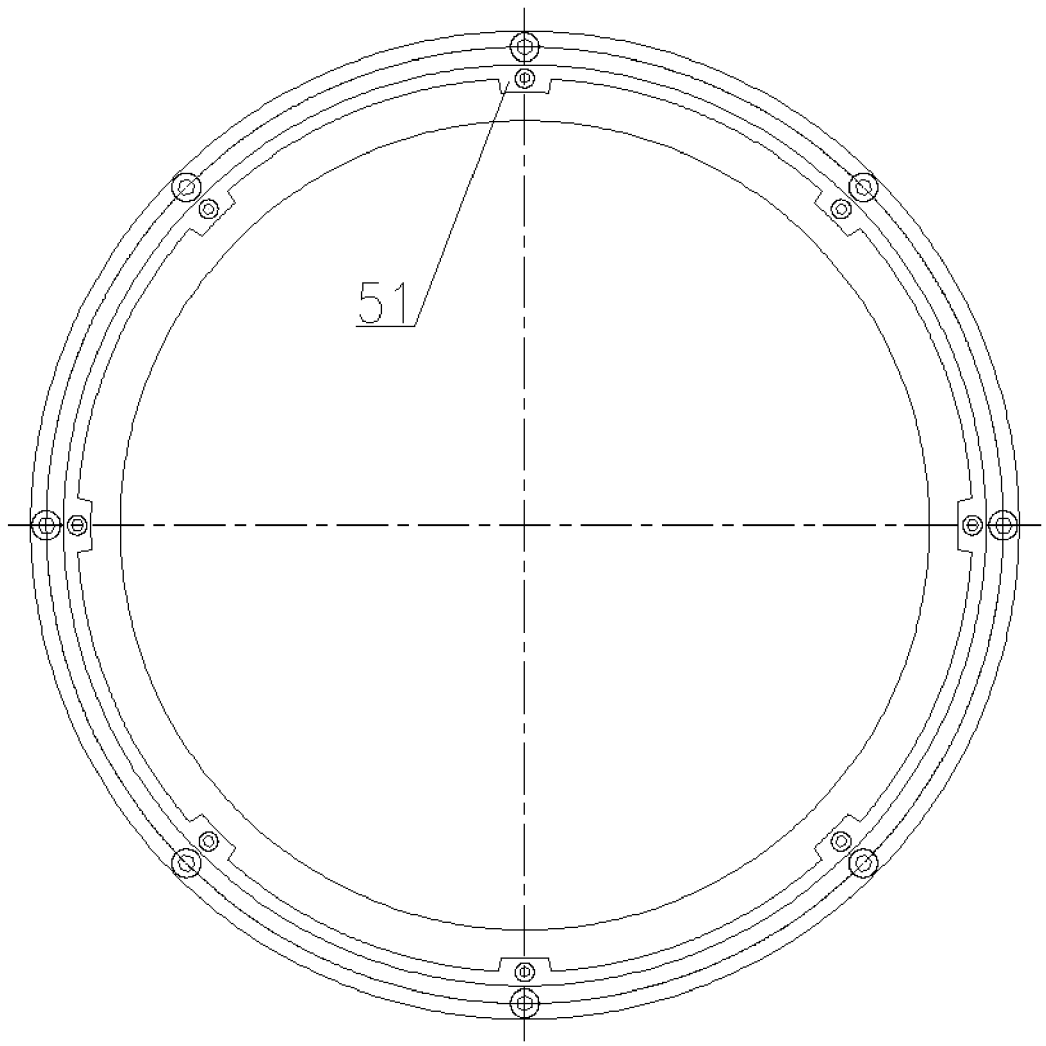
FIG. 2 is a partial right view of the assembled wheel according to the present disclosure.
Figure 3:
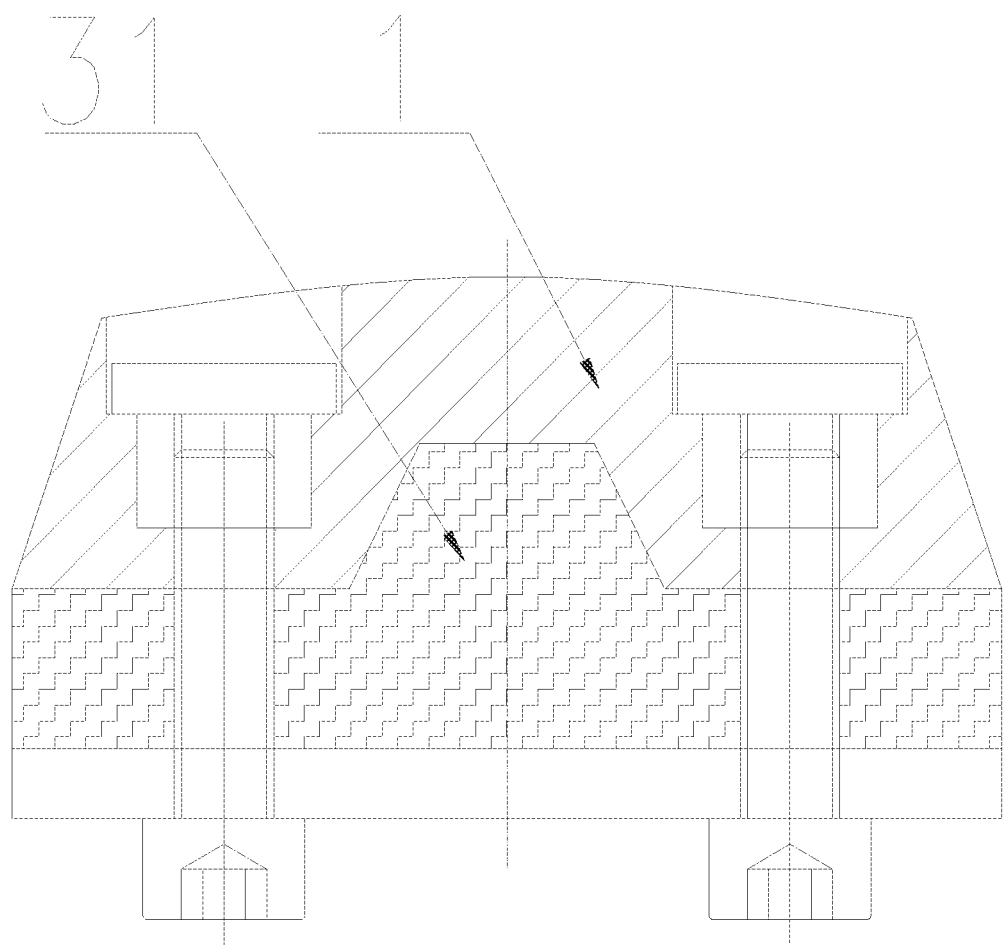
FIG. 3 is a partial sectional view of a spoke disk portion of the assembled wheel according to the present disclosure.
Figure 4:
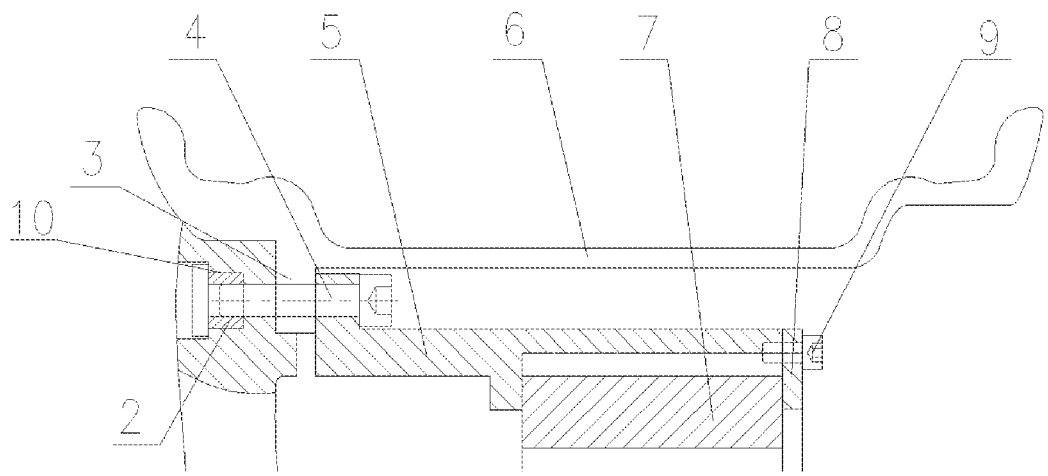
FIG. 4 is a partial enlarged view of the assembled wheel in FIG. 1.

1—spoke disk, 2—T nut, 3—connecting ring, 4—first screw, 5—fixing ring, 6—rim, 7—brake drum, 8—spacer, 9—second screw, 10—outermost T groove, 31—second boss, 51—first boss.

DETAILED DESCRIPTION

The details and working conditions of the specific device according to the present disclosure will be described below in combination with the drawings.

The device includes a spoke disk 1, a T nut 2, a connecting ring 3, a first screw 4, a fixing ring 5, a rim 6, a brake drum 7, a spacer 8, a second screw 9, the T nut 2 is installed in the outermost T groove 10 of the spoke disk 1; the spoke disk 1 is in contact with the left side of the connecting ring 3, and the left side of the fixing ring 5 is in contact with the right side of the connecting ring 3; the first screw 4 is matched with the T nut 2 to connect the spoke disk 1, the connecting ring 3 and the fixing ring 5 together; the outer side of the connecting ring 3 is integrated with the rim 6; a second boss 31 is arranged above the connecting ring 3 to fit with the groove of the spoke disk 1; a first boss 51 is arranged in the right circumferential direction of the fixing ring 5; grooves are formed on the outer side of the annular brake drum 7 to fit with the first boss 51 such that the brake drum 7 is circumferentially fixed in the fixing ring 5; and the second screw 9 axially fixes the brake drum 7 in the fixing ring 5 through the spacer 8.

In the working process, the T nut 2 is installed in the outermost T groove of the spoke disk 1; the second boss 31 on the connecting ring 3 fits with the groove on the back of the spoke disk 1; the spoke disk 1, the connecting ring 3 and the fixing ring 5 are connected together by the first screw 4; a plurality of grooves on the outer side of the brake drum 7 fit with the first boss 51 in the right circumferential direction of the fixing ring 5 such that the brake drum 7 is circumferentially fixed in the fixing ring 5; and the second screw 9 axially fixes the brake drum 7 in the fixing ring 5 through the spacer 8.

The invention claimed is:

1. An assembled wheel comprising a spoke disk, a nut, a connecting ring, a first screw, a fixing ring, a rim, an annular brake drum, a spacer, and a second screw, wherein the nut is installed in a first outermost groove of the spoke disk; the spoke disk is in contact with a left side of the connecting ring, and a left side of the fixing ring is in contact with a right side of the connecting ring; the first screw is matched with the nut to connect the spoke disk, the connecting ring and the fixing ring together; an outer side of the connecting ring is integrated with the rim; a second boss is arranged above the connecting ring to fit with a second groove of the spoke disk; a first boss is arranged in a right circumferential direction of the fixing ring; the annular brake drum is formed with a third groove fitting with the first boss on an outer side of the annular brake drum such that the annular brake drum is circumferentially fixed in the fixing ring; and the second screw axially fixes the annular brake drum in the fixing ring through the spacer.

\* \* \* \* \*